Oct. 25, 1932. F. H. OWENS 1,884,168
FILM GUIDING MECHANISM FOR SOUND RECORDING AND REPRODUCING APPARATUS
Filed July 31, 1929

INVENTOR.
FREEMAN H. OWENS.
BY Philip S. Hopkins
ATTORNEY.

Patented Oct. 25, 1932

1,884,168

UNITED STATES PATENT OFFICE

FREEMAN H. OWENS, OF NEW YORK, N. Y., ASSIGNOR TO OWENS DEVELOPMENT CORPORATION, OF NEW YORK, N. Y., A CORPORATION OF NEW YORK

FILM GUIDING MECHANISM FOR SOUND RECORDING AND REPRODUCING APPARATUS

Application filed July 31, 1929. Serial No. 382,564.

This invention relates to improvements in film guiding mechanism for sound recording and reproducing apparatus, the principal object of the invention being to provide improved means for guiding the film to and from the light station, said means being effective to prevent flexing or buckling of the film.

Another object is to provide a film guiding means which facilitates the smooth movement of the film and eliminates danger of scratching the same.

Other objects and advantages of the invention will appear as the description proceeds.

In the drawing accompanying this specification,

The same characters of reference designate the same parts in all the figures of the drawing.

Figure 1:
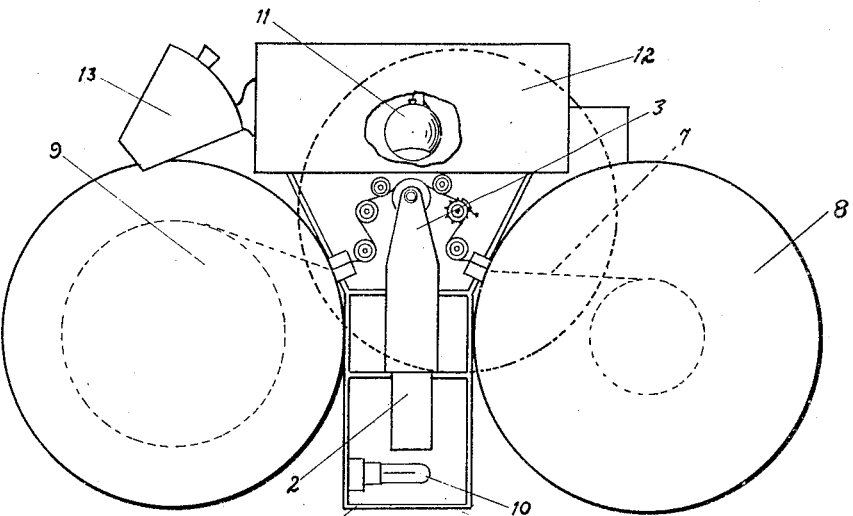
Figure 1 is a diagrammatic side view of a portion of a reproducing apparatus embodying the features of the present invention.

Referring to the drawing, 1 designates a housing in which is disposed a lens assembly 2 and a roller film support 3 comprising a pair of flanged rollers 4 and 5 mounted for rotation in spaced relation to each other to provide an opening 6 for the passage of light rays to the film 7, all as described and claimed in my copending application, Serial No. 360,871, filed May 6, 1929. On opposite sides of the housing 1 are disposed a take up reel 8 and a supply reel 9 whereby the film is caused to travel over the roller film support and past the light opening 6. In Figure 1, the apparatus is illustrated as a reproducing apparatus, and for this purpose a reproducing lamp 10 is shown in the housing 1, the rays from which lamp are focused by the lens assembly 2, through the opening 6 on the portion of the film in line with said opening and bearing a photographic sound record, whereupon the rays, modulated by their passage through the sound record on the film, are caught by a photo electric cell 11 whereby they are translated into electrical impulses and transmitted to a suitable amplifier 12 and loud speaker (not shown) in the usual manner. A conventional form of switch box 13 is shown carrying a suitable manually operable switch for opening and closing the amplifier circuit.

Figure 2:
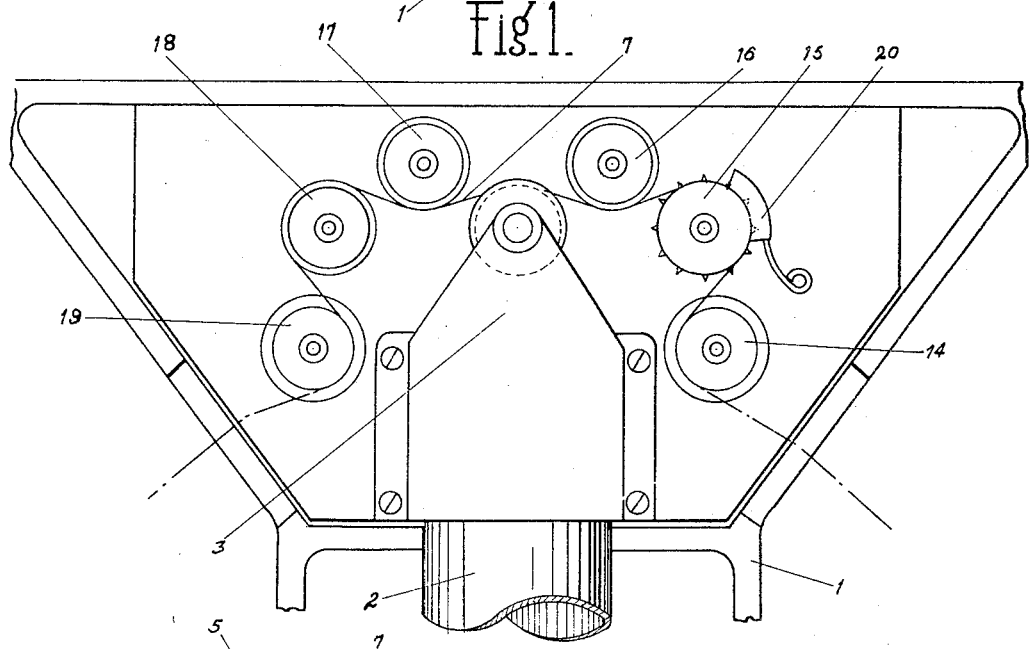
Figure 2 is a side view on an enlarged scale showing the disposition of the film guiding means within its housing.
Figure 3:
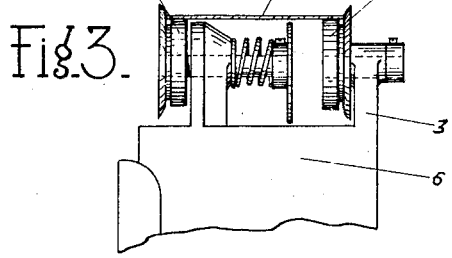
Figure 3 is a detail side view of the roller film support through which rays of light are focused on the film.

The present invention relates to a system of spaced rollers over which the film moves before and after it passes the point of exposure whereby the film is so guided to and from the light station that flexing of the film laterally is impossible. The system of rollers in the present instance is disposed symmetrically about the roller film support 3, and comprises an idler 14, a sprocket 15 and idlers 16, 17, 18 and 19. An inspection of Figure 2 will disclose that the rollers 16 and 17 are so disposed relatively to the roller film support that their peripheries overlap or intersect a horizontal plane passing in contact with the uppermost portion of the periphery of the roller film support. By reason of this arrangement the film is caused to assume a slightly undulatory form during its passage from the roller 18 to the sprocket 15 whereby any tendency of the film to flex in the direction of its width is effectively counteracted. The roller 14 is disposed in such position between sprocket 15 and the intake opening of the take up reel 8 as to prevent contact of the film with the wall of said opening, and the roller 19 is disposed in like manner between roller 18 and the outlet opening of the supply reel so as to prevent contact of the film with the wall of said outlet opening. A spring shoe 20 is shown herein for ensuring constant engagement of the teeth of the sprocket with the openings usually provided at the edges of the film, said shoe having clearance spaces at its side edges to permit passage of the sprocket teeth while the body of the shoe engages the film and retains it in contact with the sprocket in a manner which will be readily understood.

It will of course be obvious that the arrangement of rollers herein described is equally well adapted for use in recording or reproducing apparatus.

It will also be obvious that the arrangement of rollers may be utilized regardless of whether or not the special form of roller film support shown herein is used. In other words, the gist of the invention resides in so disposing the guide rollers about the point of exposure of the film that the film will travel past said point without buckling, and the most effective means of bringing about this result is to dispose the guide rollers so that an undulatory form will be imparted to the film between a point at one side of the light station or point of exposure and a point on the opposite side thereof.

I claim:—

1. In photographic sound recording and reproducing apparatus, the combination of a light station comprising a pair of spaced axially aligned rollers, means for causing a film to travel past said station in contact with said rollers, and a plurality of guide rollers disposed closely about said station on each side thereof, the peripheries of two of said rollers overlapping a plane passing in contact with said film supporting surface thereby to impart to the film an undulatory form during its passage past said light station.

2. In photographic sound reproducing apparatus, the combination of a roller film support having a light station, means for causing a film to travel past said light station in contact with said support, a plurality of guide rollers disposed closely about said roller film support on each side thereof in staggered relation thereto and to each other thereby to impart to the film an undulatory form during its passage past the light station, a light source on one side of said station and a photoelectric cell on the other side thereof in alignment with said station.

In testimony whereof, I affix my signature.

FREEMAN H. OWENS.